United States Patent [19]

Bharadwaj

[11] Patent Number: 5,787,287
[45] Date of Patent: Jul. 28, 1998

[54] REPRESENTATION OF CONTROL FLOW AND DATA DEPENDENCE FOR MACHINE

[75] Inventor: Jayashankar Bharadwaj, San Jose, Calif.

[73] Assignee: Intel Corporation, Santa Clara, Calif.

[21] Appl. No.: 578,965

[22] Filed: Dec. 27, 1995

[51] Int. Cl.$^6$ .................................................. G06F 9/45
[52] U.S. Cl. .................... 395/708; 395/706; 395/709
[58] Field of Search ................................. 395/705, 707, 395/706, 708, 709, 703

[56] References Cited

U.S. PATENT DOCUMENTS

| | | | |
|---|---|---|---|
| 5,485,616 | 1/1996 | Burke et al. | 395/700 |
| 5,530,866 | 6/1996 | Koblenz et al. | 395/700 |
| 5,555,417 | 9/1996 | Odnert et al. | 395/700 |
| 5,642,512 | 6/1997 | Tanaka et al. | 395/705 |

OTHER PUBLICATIONS

Ural, "Modeling Software for Accurate Data Flow Representation", Soft. Engg. Proc., May 1993, pp. 277–286.

Choi et al., "On the Efficient Engineering of Ambitious Program Analysis", IEEE Trans. Soft. Engg., vol. 20, No. 2, Feb. 1994, pp. 105–114.

Kramer et al., "The Combining DAG", IEEE Trans. on Parallel and Distr. Systems, v 5, n. 8, Aug. 1994, pp. 805–813.

*Primary Examiner*—Emanuel Todd Voeltz
*Assistant Examiner*—Kakali Chaki
*Attorney, Agent, or Firm*—Blakely, Sokoloff, Taylor & Zafman

[57] ABSTRACT

A method of representing data dependence and control flow between two instructions in computer-executable instructions. Each instruction is for reading or writing a variable. The sequence of instructions has a plurality of control flow paths. A dependency path vector (DPV) is generated comprising a plurality of bits and representing both the data dependency and the control flow between the first instruction and the second instruction with respect to the variable. One bit of the DPV is allocated for each of the control flow paths in the sequence of instructions, and the value of each bit indicates whether there is a dependency between the first instruction and the second instruction along the corresponding path with respect to the variable.

32 Claims, 8 Drawing Sheets

FIG_1A

FIG_1B

FIG_2

FIG_3

FIG_4

FIG_5

FIG_6

FIG_7

FIG_8

FIG_9

REPRESENTATION OF CONTROL FLOW AND DATA DEPENDENCE FOR MACHINE

FIELD OF THE INVENTION

The present invention pertains to the field of computer software. More particularly, the present invention relates to generating a combined representation of control flow and data dependence between instructions in computer code.

BACKGROUND OF THE INVENTION

Compilers are generally used in the field of computer software to convert a high-level program, or "source code", into a machine-readable form, or "object code". Compilers often perform various additional functions, however, such as optimization and scheduling of the object code. Effective optimization and scheduling are key considerations in improving the performance of computers, especially those using superscalar microprocessors. In order to perform many optimization and scheduling tasks, compilers require information relating to data dependence and control flow in the source code. A problem associated with existing technology, however, is that control flow information and data dependence information are stored as separate entities, which complicates optimization and scheduling.

Control flow relates to the various logical "paths" that can be taken by a processor when a computer program is executed. Computer instructions can be grouped into a number of "basic blocks", each having the property that, if any instruction in the block is executed, all instructions in the block will be executed. A program can be represented in the form of a flow diagram including the various blocks and the paths between them. Conditional instructions, such as "if-then-else" instructions, cause branches to occur in the flow of the program, thus creating multiple paths. Hence, control flow information describes which paths may be taken under a given set of conditions.

Data dependence refers to a relationship between two instructions which include a variable. An instruction which writes a variable may be referred to as a "definition", or a "writer". An example of a definition is the instruction "X=2", which writes the variable X. An instruction which reads a variable may be referred to as a "use", or a "reader". An example of a use is the instruction, "Y=X+2", which reads the variable X (in order to write the variable Y). There is a data dependence between any two instructions in a sequence of code if the second instructions reads a value written by the first instruction.

In optimization and scheduling, it is useful to combine control flow information with data dependence information. However, with existing technology it is often a complicated task to represent data dependence if the two instructions lie in different basic blocks. For example, it may be necessary to determine "flow dependence" between two instructions. There is a flow dependence from a first instruction to a second instruction along a given path over a given variable if: 1) the control flow path passes through the first instruction and then through the second instruction; 2) the first instruction writes the variable and the second instruction reads the variable; and 3) there is no other instruction along the path between the first instruction and the second instruction which writes the variable. Existing technology, however, stores the necessary control flow information and the required data dependency information in separate data structures, making it difficult to analyze their interaction. Alternatively, data dependence information is computed only locally for a particular basic block. As a result, many optimizations are limited to being performed only on a local basis, or else the optimizations become more complicated or conservative.

SUMMARY OF THE INVENTION

A method of representing data dependence and control flow between a first instruction and a second instruction in a sequence of software instructions is provided. The first instruction and the second instruction are each for reading or writing a variable. The sequence of instructions is characterized by a plurality of control flow paths. In the method, a plurality of units of memory space are allocated, with each unit corresponding to one of the control flow paths. A value is assigned to each unit to indicate whether a dependency exists between the first instruction and the second instruction with respect to the variable along the control flow path represented by that unit. The plurality of units of memory space represents data dependency and control flow between the first instruction and the second instruction.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method of providing a combined representation of both data dependence and control flow between a first instruction and a second instruction in a sequence of computer-executable instructions is provided. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1A:
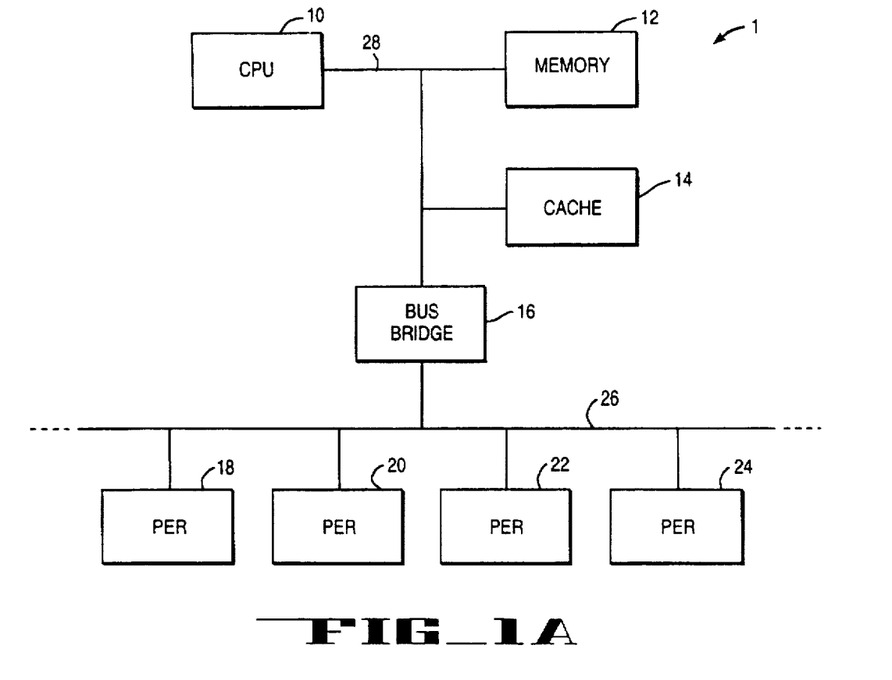
FIG. 1A is a block diagram of a computer system in which the present invention may be implemented.

In the preferred embodiment, the method of the present invention is performed by a general purpose processor programmed with instructions that cause the processor to perform the necessary steps. In alternative embodiments, however, the method may be performed by specific hardware components that contain hard-wired logic for performing the necessary steps, or by any combination of programmed general purpose computer components and custom hardware components. FIG. 1A illustrates a general purpose computer 1 in which the present invention may be implemented. The computer 1 includes a central processing unit (CPU) 10 coupled to a main memory 12 and a cache memory 14 through a system bus 28. A number of peripheral devices 18, 20, 22, and 24 are coupled to a peripheral component bus 26. The peripheral component bus 26 is coupled to the system bus 28 through a bus bridge 16. The peripheral devices 18, 20, 22, and 24 may include one or more of various input/output (I/O) devices, such as a keyboard, a display monitor, a mouse or other cursor control device, and, a disk drive, CD-ROM drive, or other data storage device. The method steps of the present invention may be embodied in any appropriate storage medium, such as on a floppy disk, hard disk, CD-ROM, or in main memory 12.

Figure 1B:
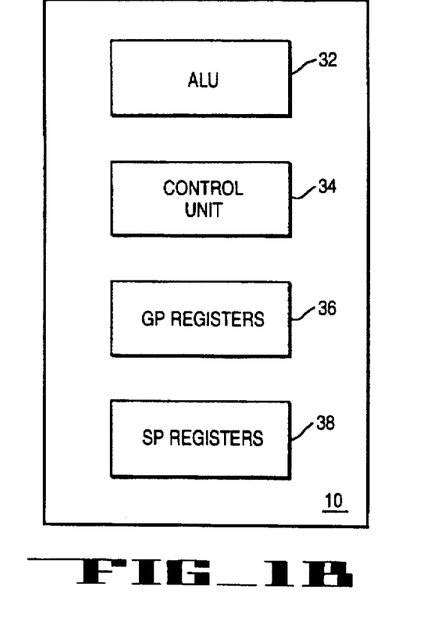
FIG. 1B is a block diagram of a central processing unit.

FIG. 1B illustrates the CPU 10 of the computer 1. The CPU 10 includes an arithmetic logic unit 32, a control unit 34, several general purpose registers 36, and several special purpose registers 38. It is assumed for purposes of this description that the general purpose registers 36 and the special purpose registers 38 each are 32-bit registers. In other embodiments, however, these registers may include a different number of bits without departing from the scope of the present invention.

In the present invention, both data dependence information and control flow information for any two instructions in a sequence of instructions can be represented by a dependency path vector (DPV). A DPV includes a number of bits, each of which corresponds to a particular control flow path of the sequence of instructions. The value of each bit indicates whether a dependency exists between the two instructions along the corresponding path with the respect to a particular variable. Consider, for example, the following computer instructions:

If $A>5$ then $X=10$ else $X=12$ $Y=X+2$

Figure 2:
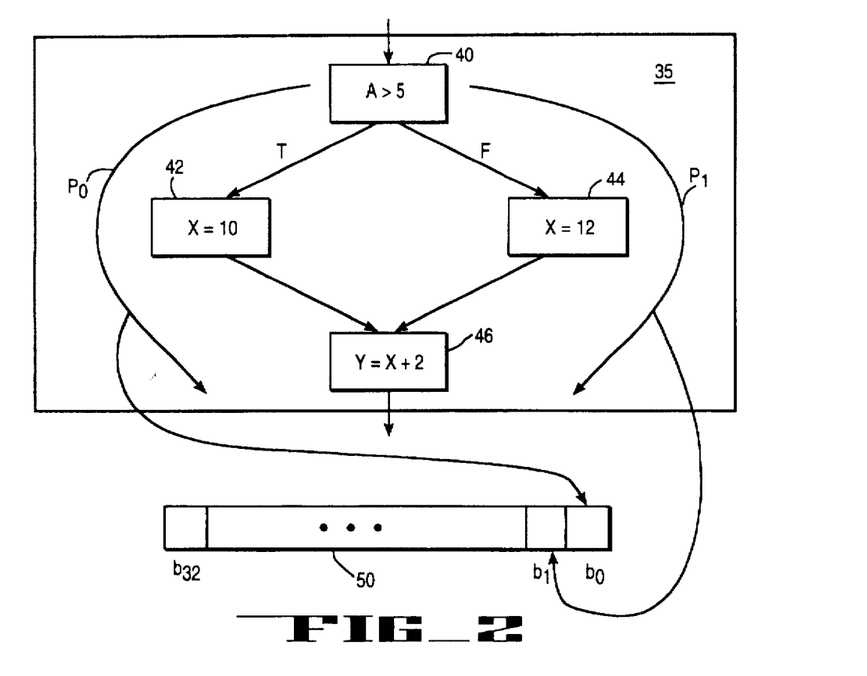
FIG. 2 is a control flow diagram for a sequence of instructions illustrating a path vector.

FIG. 2 provides a control flow diagram of the above sequence of instructions. Referring to FIG. 2, the sequence defines a region 35 containing four basic blocks 40, 42, 44, and 46. Further, the sequence defines two possible control flow paths: path $P_0$ and path $P_1$. A path vector (PV) 50 may be generated to represent boolean properties along paths in region 35. In the preferred embodiment, a path vector has a length of 32*N bits, where N is the smallest integer such that 32*N is greater than or equal to the number of control flow paths in the region. This length for path vectors is in accordance with the 32-bit size of registers 36 and 38 in the CPU 10. It is not necessary that every bit of the path vector be used. It should be appreciated, however, that the length of the PVs may be different in other embodiments. Because region 35 only has two control flow paths, only the two lowest order bits $b_0$ and $b_1$ of PV 50 are used. Hence, path $P_0$ is mapped to the lowest order bit $b_0$ of PV 50, while path $P_1$ is mapped to the next lowest order bit $b_1$ of PV 50. Note that paths can be mapped to bits in PV 50 in other ways. The only requirement is a one to one correspondence between bits in PV 50 and control flow paths.

Figure 3:
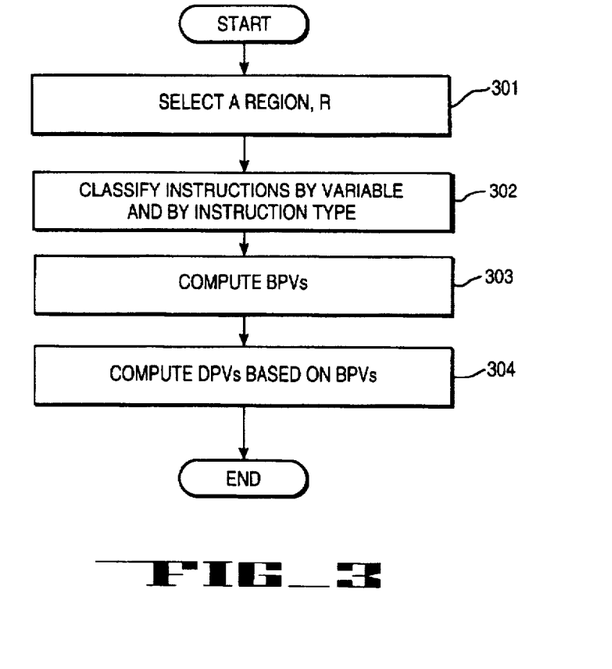
FIG. 3 is a flowchart illustrating steps for computing dependency path vectors (DPVs) for a given region.

FIG. 3 illustrates a method of computing DPVs for a given region. Initially, the region R is defined as including a particular sequence of code (step 301). Each DPV is computed with respect to a particular variable. Therefore, before computing DPVs for a given sequence of code, any instructions in the sequence which reference a variable are identified with the appropriate variable(s) and then classified as readers or writers of the variable(s) (step 302). After classifying the instructions, a block path vector (BPV) is generated for each basic block in the region R (step 303). DPVs are then computed for each reader-writer pair of instructions in the region R based on the BPVs (step 304).

Figure 4:
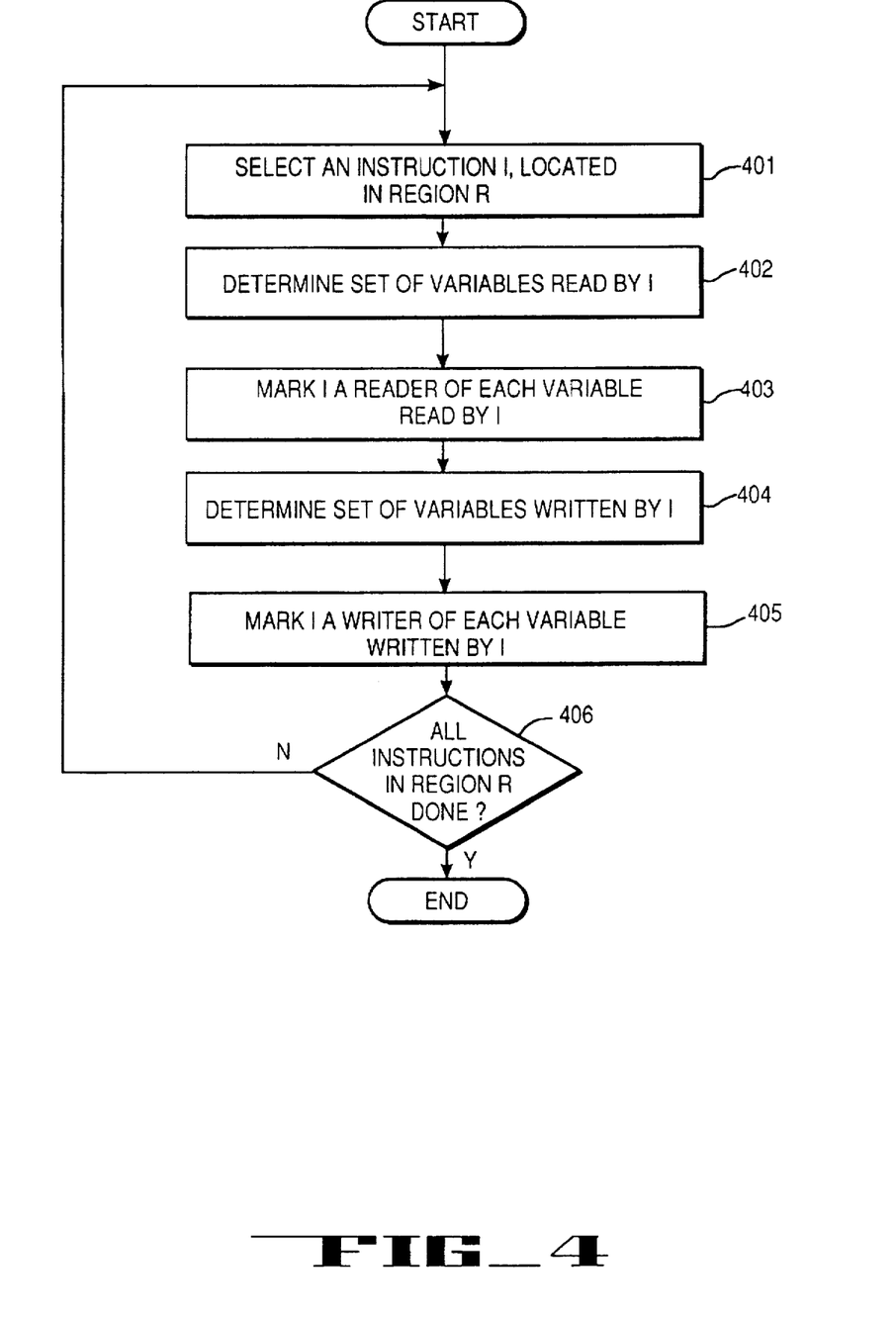
FIG. 4 is a flowchart illustrating steps for grouping instructions into definitions and uses.

FIG. 4 is a flowchart illustrating how the classification of instructions in a region R is performed. First an (as yet unselected) instruction I located in the region R is selected (step 401). The variables read by I in the region R are then identified (step 402) and I is marked a reader of each of them (step 403). The variables written by I in region R are identified (step 404) and I is marked a writer of each of them (step 405). This process is then repeated until all instructions in region R have been classified by variable and by instruction type (step 406).

A preliminary step in computing a DPV for any two instructions over a given variable is the step of computing block path vectors (BPVs). Each basic block lying within a region R is characterized by one BPV. A BPV has the same format as a DPV, in that a BPV is a vector of at least as many bits as the number of paths in the region R, in which each bit corresponds to a particular path through the region. However, a BPV does not represent dependency information between two instructions. Rather, a BPV indicates only which paths in a region pass through a given basic block, based on the value of each bit.

Figure 5:
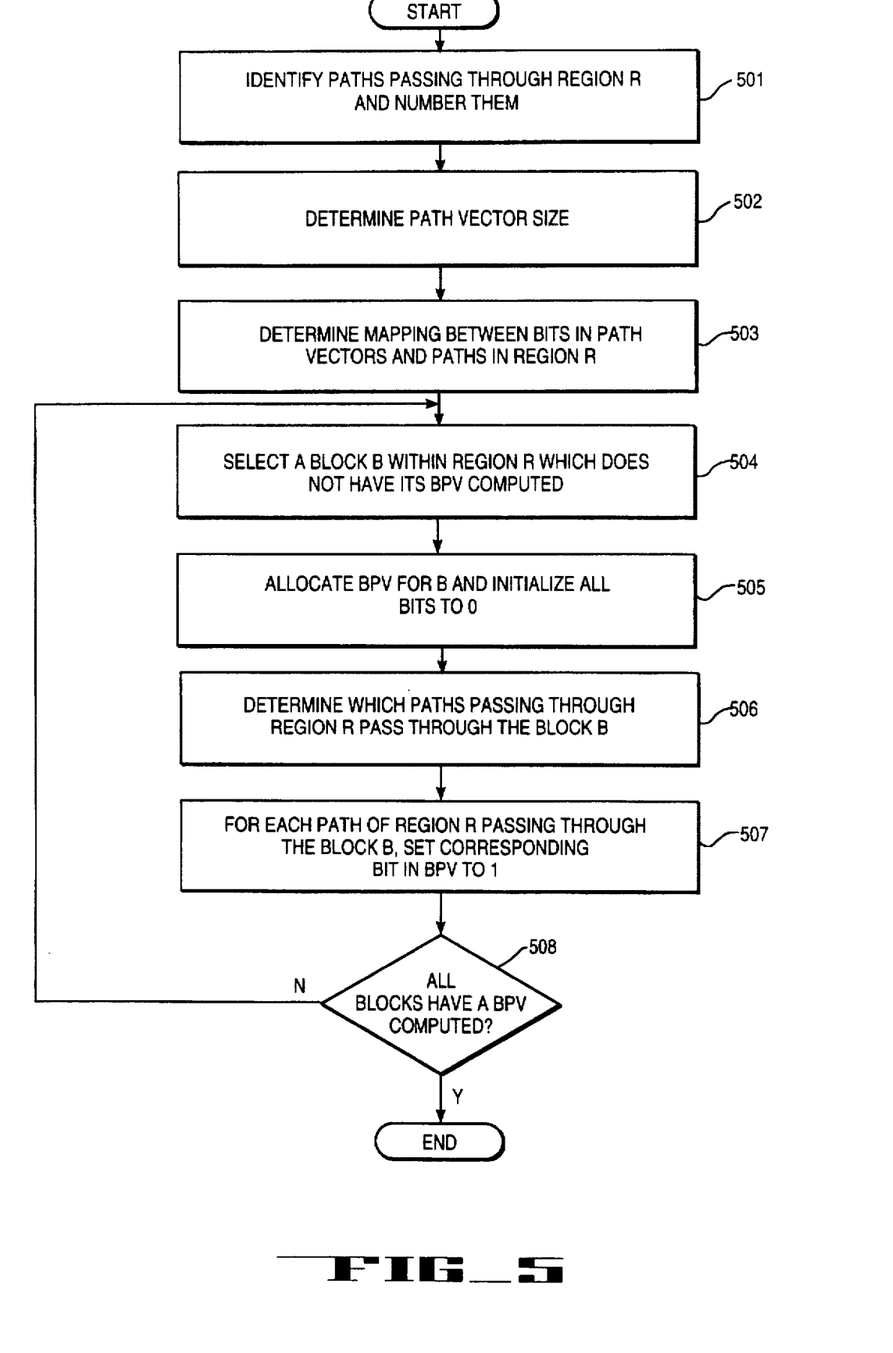
FIG. 5 is a flowchart illustrating steps for generating block path vectors for basic blocks.

Referring now to FIG. 5, the process for computing a BPV for a basic block is illustrated. First, the paths passing through the region R are identified and numbered (step 501). The size of path vectors in bits is then determined as the smallest multiple of 32 that is greater than or equal to the number of paths (step 502). The mapping between bits in path vectors and paths is then defined (step 503). Next, a basic block B is selected from the region R and a BPV is allocated for it (step 504). All bits in the BPV are initialized to 0 (step 505). Next, among the paths passing through region R, those that pass through the basic block B are determined (step 506). For each path which passes through the basic block B, the corresponding bit in the BPV is set to 1 (step 507). This process is then repeated for each basic block within the region R (step 508).

The DPV of any two instructions, INSTR_A and INSTR_B, is generally defined as follows. If INSTR_B comes before INSTR_A on any path, the DPV is 0, i.e., all bits are 0. Otherwise the DPV is the intersection of the BPVs for the basic blocks which contain those two instructions, i.e., the intersection of the BPVs for BLOCK(INSTR_A) and BLOCK(INSTR_B). This intersection is the bitwise logic AND of the BPVs for these instructions, as represented by the equation (1):

$$\text{DPV(INSTR\_A, INSTR\_B)} = \quad (1)$$

$$\text{BPV[BLOCK(INSTR\_A)]} * \text{BPV[BLOCK(INSTR\_B)]}$$

An exception to equation (1) occurs, however, when a third instruction falling in between INSTR_A and INSTR_B in a path between INSTR_A and INSTR_B overwrites the variable for which the DPV is being computed, as will be described below.

Figure 6:
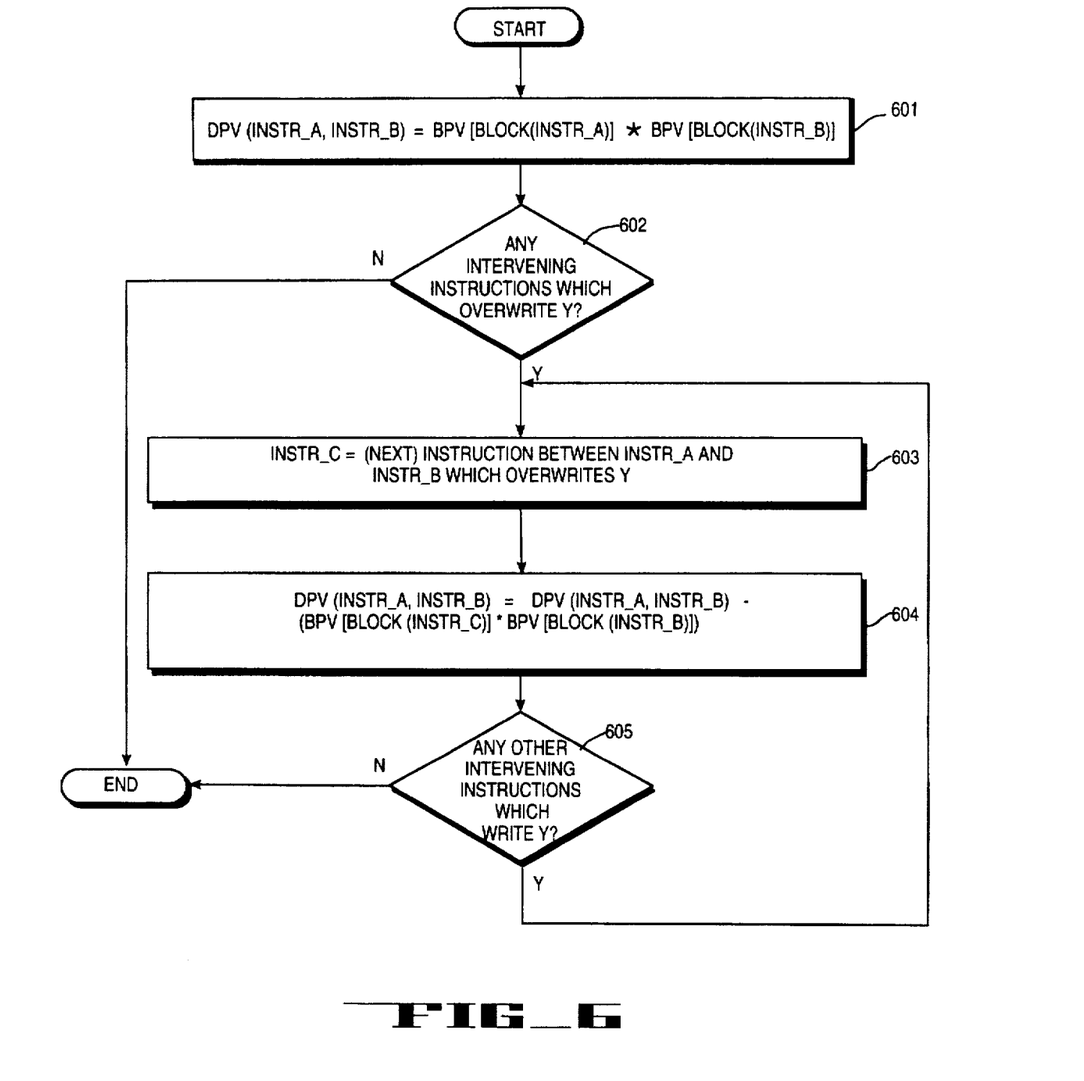
FIG. 6 is a flowchart illustrating steps for generating a dependency path vector.

FIG. 6 illustrates the steps for computing a DPV between two instructions, INSTR_A and INSTR_B over a given variable Y. First, the DPV is computed according to equation (1) (step 601). Next, if there are no instructions which write variable Y between INSTR_A and INSTR_B in the sequence of instructions (step 602), then the DPV computed according to equation (1) (in step 601) is correct, and the computation is complete. If, however, there are one or more instructions between INSTR_A and INSTR_B in the sequence, which write variable Y (step 602), then the result of equation (1) is not correct; therefore, an instruction INSTR_C which overwrites variable Y and falls between INSTR_A and INSTR_B is selected (step 603). As set forth in equation (2), the initial value of DPV(INSTR_C, INSTR_B), namely (BPV [Block (INSTR_A)]*BPV [Block (INSTR_B)]), is then subtracted from DPV (INSTR_A, INSTR_B) (step 604). Note that this subtraction is a bitwise subtraction without carry, which can also be thought of as a logical AND NOT operation.

$$DPV(INSTR\_A, INSTR\_B) = \qquad (2)$$

$$DPV(INSTR\_A, INSTR\_B) - DPV(INSTR\_C, INSTR\_B)$$

DPV(INSTR_C, INSTR_B) used in equation (2) may be the initial value computed by equation (1) or the value corrected for some or all other writes to Y between INSTR_C and INSTR_B. Either form used in the algorithm of FIG. 6 will produce the same result. If there are no other instructions between INSTR_A and INSTR_B which write variable Y (step 605), then the computed value of DPV(INSTR_A, INSTR_B) over variable Y is correct. If there are other instructions which overwrite variable Y, then the above process (steps 603–605) is repeated for each remaining instruction between INSTR_A and INSTR_B which overwrites variable Y, such that the final value of DPV(INSTR_A, INSTR_B) upon completion of this process is the correct value. The final value of DPV(INSTR_A, INSTR_B) indicates the flow dependence between the two instructions INSTR_A and INSTR_B over a given variable Y.

The above-described method of computing a DPV will now be demonstrated using the following sequence of computer program code:

X=10

If A>5 then W=W+2 else X=12

Y=X+2

Figure 7:
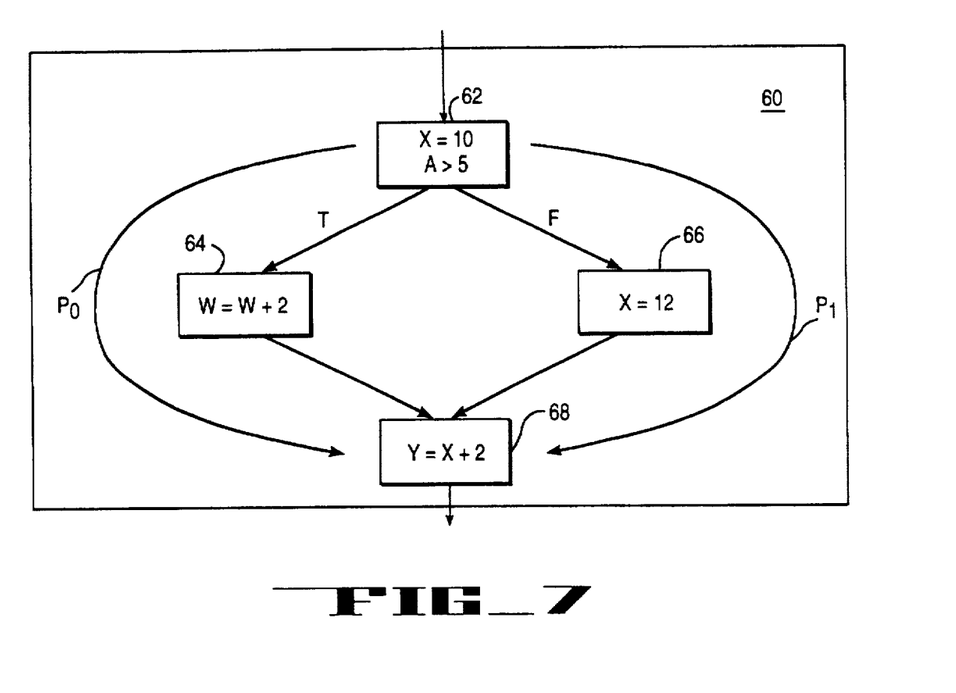
FIG. 7 is a control flow diagram for a sequence of instructions.

The above sequence of instructions defines a region 60, which is illustrated in FIG. 7. The sequence includes four basic blocks 62, 64, 66, and 68 and two control flow paths $P_0$ and $P_1$. Path $P_0$ includes blocks 62, 64, and 68, while path $P_1$ includes blocks 62, 66, and 68. Assume now that it is desirable to determine the DPV for the instruction X=10 and the instruction Y=X+2 with respect to the variable X. Accordingly, the first step is to compute the BPVs for the basic blocks in region 60. For this example, only the two lowest-order bits of BPVs and DPVs will be considered, since region 60 only includes two paths. Let the lowest-order bit of each BPV correspond to path $P_0$ and the second lowest-order bit correspond to path $P_1$. To compute the BPV for block 62, it is first determined which of the paths passing through region 60 pass through block 62. Both paths $P_0$ and $P_1$ pass through block 62. Therefore, BPV(block 62) is equal to (11) ($P_1,P_0$). Similarly, BPV(block 68) is also equal to (11), because paths $P_0$ and $P_1$ both pass through block 68. BPV (block 64) is (01) since only $P_0$ passes through block 64, whereas BPV (block 66) is (10) since only $P_1$ passes through block 66. The next step is to set the DPV of instruction X=10 and instruction Y=X+2 with respect to variable X equal to the intersection (logic AND) of the BPV for block 62 and the BPV for block 68, according to equation (1), as shown in equation (3).

$$DPV(X = 10, Y = X + 2) = \qquad (3)$$

$$BPV(block\ 62) * BPV(block\ 68) = (11) * (11) = (11)$$

The result of equation (3) would be correct if there were no instructions between instruction X=10 and instruction Y=X+2 which overwrite X. However, the instruction X=12 in basic block 66 does overwrite X. Consequently, the result of equation (3) must be modified. Therefore, the DPV of instruction X=10 and instruction Y=X+2 with respect to X is corrected as set forth in equation (4).

$$DPV(X = 10\ Y = X + 2) = (11) - \qquad (4)$$

$$BPV(block\ 66) * BPV(block\ 68) = (11) - ((10) * (11)) = (11) - (10) = (01)$$

Other than the instruction X=12, there are no instructions between instruction X=10 and instruction Y=X+2 which overwrite the variable X. Therefore, the final result, DPV (X=10, Y=X+2), is as shown in equation (5).

$$DPV(X=10,\ Y=X+2)=(01) \qquad (5)$$

Equation (5) indicates the flow dependence between the two instructions X=10 and Y=X+2 over variable X. Specifically, the resulting value of 01 indicates that there is a dependence between these two instructions over variable X along path $P_0$, but not along path $P_1$.

Figure 8:
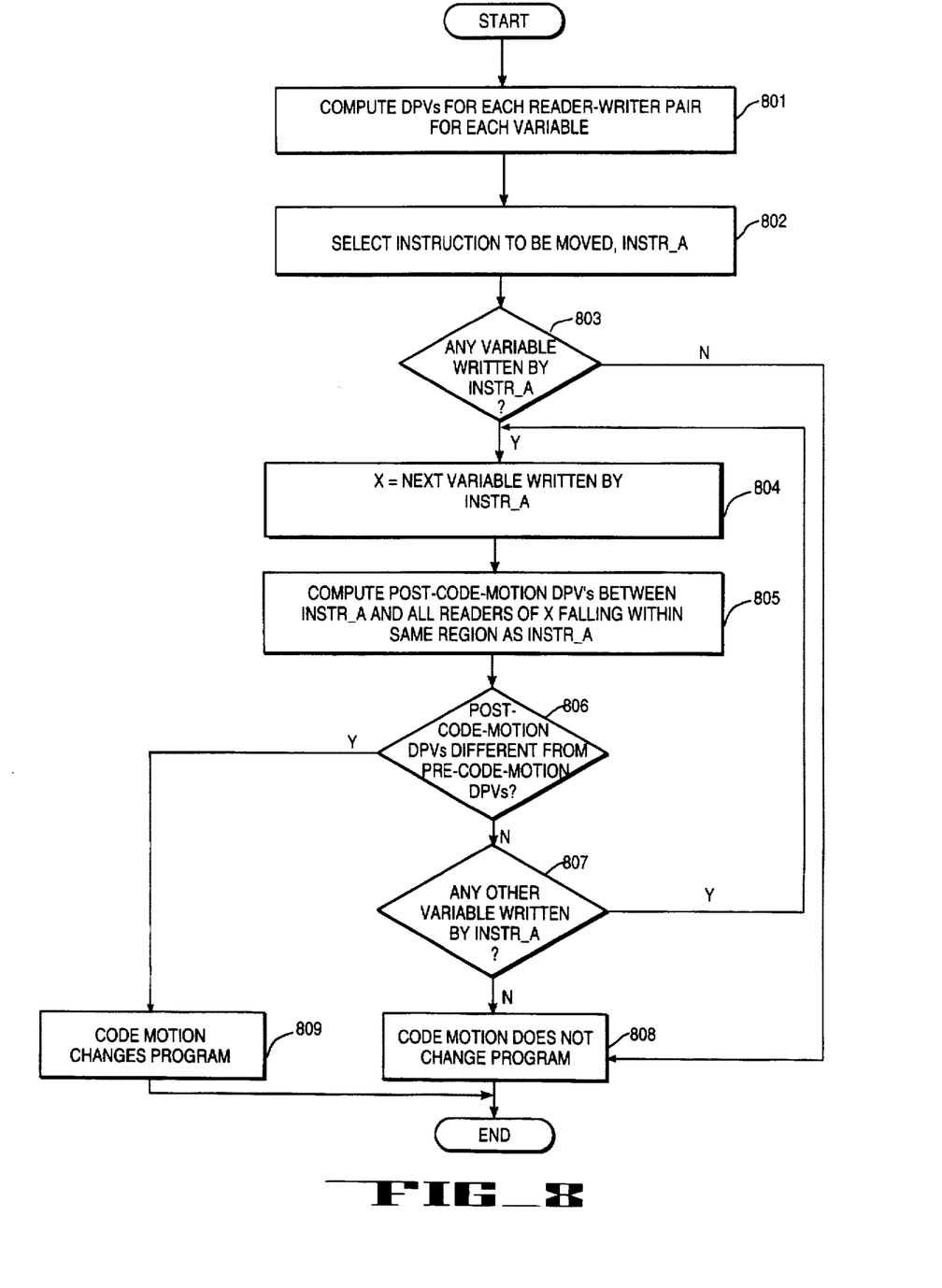
FIG. 8 is a flowchart illustrating steps for performing code motion according to the present invention during scheduling of computer code.

Computation of DPVs is useful for scheduling program code. For example, DPVs can be used to determine if particular code motion or code reordering may be performed without altering the meaning of the source code. Note that by inserting extra register copy operations, the code motion can be made to not alter the meaning of the source code. This technique is referred to as "register renaming". FIG. 8 illustrates a method of using DPVs to assist in scheduling code. It is assumed here that the values read by the instruction have been correctly computed at the location the instruction is to be moved to. This function is usually ensured by the scheduling algorithm chosen. DPVs are computed for each reader-writer pair of instructions with respect to each variable in the program (step 801). This set of DPVs may be referred to as the "pre-code-motion DPVs". Assume now that the compiler determines that it would be desirable to move an instruction INSTR_A which contains a variable X to a new location within a program (step 802) to improve speed of execution. If INSTR_A does not write any value (step 803), then the proposed code motion will not change the meaning of the program (step 808). If, however, INSTR_A is a writer of a variable X (step 804), then DPVs are recomputed between INSTR_A and all instructions in the program which are readers of X (step 805), using the code as it would be appear if INSTR_A had been moved. This second set of DPVs may be referred to as the "post-code-motion DPVs". Next, the post-code-motion DPVs are compared to the pre-code-motion DPVs (step 806). If there is a difference between the post-code-motion DPVs and the pre-code-motion DPVs, then the code motion alters the meaning of the program (step 809), and so the code motion requires register renaming. If there is no difference between the post-code-motion DPVs and the pre-code-motion DPVs, then a determination is made of whether any other variable is written by INSTR_A (step 807). If another variable is written by INSTR_A, then the test (steps 804–806) is repeated; otherwise, the code motion does not change the program (step 808).

An example of computing DPVs and using DPVs in scheduling code will now be provided using the following sequence of instructions:

```
X = A
If (C1)
    Then if (C3)
        X = C
    End if
    Y = G
Else
    Y = B
    If (C2)
        X = Y + E
    Else
        P = X + D
    End if
    V = X + F
End if
R = Y
S = X
```

Figure 9:
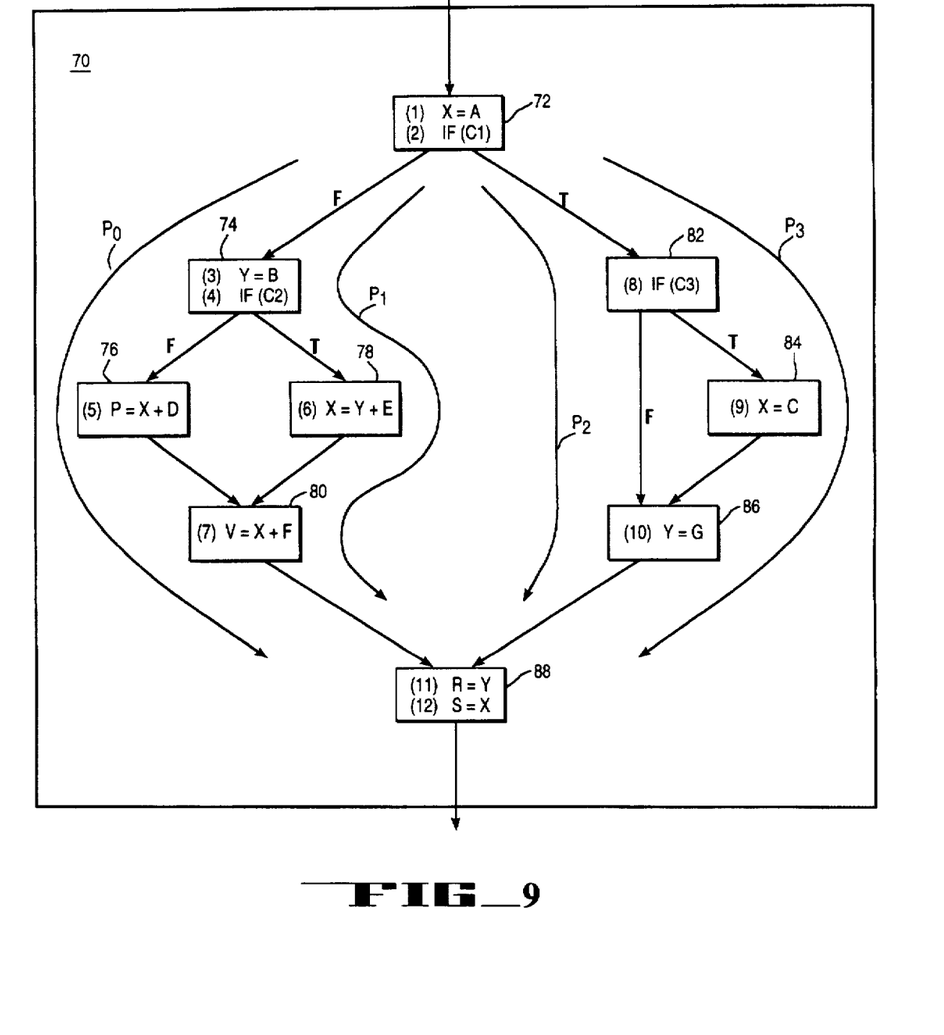
FIG. 9 illustrates a flow diagram for a sequence of instructions.

Referring now to FIG. 9, the above sequence of instructions defines a region 70 containing a number of basic blocks 72, 74, 76, 78, 80, 82, 84, 86, and 88. Further, region 70 contains four control flow paths $P_0$–$P_3$. Path $P_0$ includes blocks 72, 74, 76, 80, and 88; path $P_1$ includes blocks 72, 74, 78, 80 and 88; path $P_2$ includes blocks 72, 82, 86, and 88; and path P3 includes blocks 72, 82, 84, 86, and 88.

Let the BPVs for the basic blocks in region 70 be defined such that the four lowest-order bits of each BPV are designated $b_0$–$b_3$, where $b_0$ is the lowest-order bit. Further, let: $b_0$ correspond to path $P_0$, $b_1$ correspond to path $P_1$, $b_2$ correspond to path $P_2$, and $b_3$ correspond to path $P_3$. The BPVs for the basic blocks in region 70 are (ignoring all unnecessary bits):
BPV(block 72)=1111
BPV(block 74)=0011
BPV(block 76)=0001
BPV(block 78)=0010
BPV(block 80)=0011
BPV(block 82)=1100
BPV(block 84)=1000
BPV(block 86)=1100
BPV(block 88)=1111

Because all paths in region 70 pass through basic block 72, BPV(block 72) is 1111. In contrast, because only paths $P_0$ and $P_1$ pass through basic block 74, BPV(block 74) is 0011, and so forth.

Assume now that it desirable to compute DPVs for region 70 with respect to variable X. Referring still to FIG. 9, the instructions that write X are instructions 1, 6, and 9, while the instructions that read X are instructions 5, 7, and 12. DPVs can be computed between each writer of X and each reader of X. For example, DPV (1, 12) is computed as follows:

Step 1:
DPV(1,12) is set equal to BPV(Block(72))*BPV(Block (88)). Hence, DPV(1,12)=1111*1111=1111. Similarly, DPV (6, 12)=BPV(Block(78))*BPV(Block(88))=0010*1111= 0010; and, DPV(9, 12)=BPV(Block(84))*BPV(Block(88)) =1000*1111=1000.

Step 2:
Since instructions 6 and 9 write X and fall between instructions 1 and 12, DPV(6, 12) and DPV(9, 12) must be subtracted from DPV(1, 12). Thus:

$$DPV(1, 12) = DPV(1, 12) - DPV(6, 12) = \begin{array}{r} 1111 \\ -0010 \\ \hline 1101 \end{array}$$

$$DPV(1, 12) = DPV(1, 12) - DPV(9, 12) = \begin{array}{r} 1101 \\ -1000 \\ \hline 0101 \end{array}$$

Hence, we finally obtain DPV(1, 12)=0101. This result indicates that instruction 12 depends on instruction 1 with respect to variable X only if the program executes along path $P_0$ or path $P_2$. Similarly, for DPV (1,7), we have DPV (1,7)=[BPV(Block(72))*BPV(Block(80))]−DPV(6,7)= [1111*0011]−0010=0001. This result indicates that instruction 7 depends on instruction 1 with respect to variable X only if the program executes along path $P_0$. This result is logical, because instruction 6 overwrites X on path $P_1$.

In contrast, the computation of DPV(1,5) is simpler, because there is no instruction that overwrites variable X in the sequence between instruction 1 and instruction 5. Therefore, DPV(1,5) is simply equal to BPV(Block(72)) *BPV(Block(76))=1111*0001=0001. This result indicates that instruction 5 depends on instruction 1 only along path $P_0$ with respect to variable X.

With respect to DPV(6, 5), we have DPV(6,5)=BPV (Block(78))* BPV(Block(76))=0010*0001=0000. This result indicates that instruction 5 cannot read instruction 6, which is a logical result, since these two instructions lie on different paths.

Thus, the DPVs between each writer of X and each reader of X are summarized as follows:
DPV(1,5)=0001
DPV(1,7)=0001
DPV(1, 12)=0101
DPV(6, 5)=0000
DPV(6, 7)=0010
DPV(6, 12)=0010
DPV(9, 5)=0000
DPV(9, 7)=0000
DPV(9, 12)=1000

Similarly, the writers of Y are instructions 3 and 10, and the readers are 6, and 11, and the DPVs for variable Y are:
DPV(3, 6)=0010
DPV(3, 11)=0011
DPV(10, 6)=0000
DPV(10,11)=1100

The DPVs can now be used for scheduling instructions or code motion. Suppose it is desirable to move instruction 3, which is a writer of Y, from block 74 to block 72. The compiler must determine whether this code motion changes the meaning of the program. To make this determination, the DPVs between instruction 3 and all readers of Y (i.e., DPV(3, 6) and DPV(3, 11)), are recomputed based on the proposed code motion. If any of these DPVs change, then the code motion changes the meaning of the program.

If instruction 3 is moved to block 72, the post-code-motion DPV(3, 6) and DPV(3, 11) are computed as follows:

Step 1:

$$DPV(3,6) = BPV(\text{block }72) * BPV(\text{block }78)$$
$$= 1111 * 0010$$
$$= 0010$$

and $$DPV(3,11) = BPV(\text{block }72) * BPV(\text{block }88)$$
$$= 1111 * 1111$$
$$= 1111$$

Step 2:

$$DPV(3,11) = DPV(3,11) - DPV(10,11)$$
$$= 1111$$
$$- 1100$$
$$DPV(3,11) = 0011$$

Since DPV(3, 11) and DPV(3, 6) are unchanged, the code motion does not alter the meaning of the program.

In performing optimization, it is also useful to represent boolean properties other than data dependence uniquely along each path. Path vectors according to the present invention can be used for such purposes. For example, path vectors can be used in the analysis of control flow relationships between blocks, such as the properties of control dependence equivalence, dominance, post-dominance, and speculativeness.

Two blocks B and C are said to be "control dependence equivalent" if every path passing through B also passes through C and every path passing through C also passes through B. An example of an algorithm for determining control dependence equivalence between blocks B and C by using the present invention is as follows:

CONTROL DEPENDENCE EQUIVALENCE (B, C)

---
if (BPV (B) == BPV (C))/*i.e., all corresponding bits are the same value */
    return TRUE
else
    return FALSE
---

A block B is said to "dominate" another block C if B occurs before C and every path that passes through C also passes through B. An example of an algorithm for determining whether block B dominates block C by using the present invention is as follows: DOMINATES (B, C)

---
if (there is a path that leads from C to B)
    return FALSE
else
if (BPV (B) contains BPV (C))/*i.e., if a bit in BPV(C) is set the
    ** corresponding bit in BPV(B) is
    also set */
    return TRUE
else
    return FALSE
---

A block B is said to "post-dominate" another block C if B occurs after C and every path that passes through C also passes through B. An example of an algorithm for determining whether block B post-dominates block C by using the present invention is as follows:

POST DOMINATES (B, C)

---
if (there is a path that leads from B to C)
    return FALSE
else
if (BPV (B) contains BPV (C))/*i.e. if a bit in BFV (C) is set the
    ** corresponding bit in BPV (B) is
    also set */
    return TRUE
else
    return FALSE
---

Referring again to FIG. 9, block 72 and block 88 are control dependence equivalent since BPV(block 72) equals BPV(block 88), which equals (1111). Similarly, blocks 74 and 80 are control dependence equivalent, and blocks 82 and 86 are control dependence equivalent.

Block 72 dominates every other block since no other block precedes block 72 and BPV(block 72), which is (1111), contains every other BPV. Block 88 post-dominates every other block, since no other block comes after block 88 and BPV(block 88), which is (1111) contains every other BPV. Block 74 dominates blocks 76 and 78, since neither block 76 nor block 78 precedes block 74, and BPV(block 74), which is (0011), contains BPV(block 76), which is (0001), and BPV(block 78), which is (0010). Block 80 post-dominates Blocks 76 and 78, since neither block 76 nor block 78 come after block 80, and BPV(block 80), which is (0011), contains BPV(block 76), which is (0001), and BPV (block 78), which is (0010).

With regard to the property of speculativeness, motion of an instruction out of its block B to another block C might cause the instruction to be executed sometimes when it would not have been executed had the instruction not been moved. Such code motion is called speculative. The instruction is said to be speculatively executed on a path P if the block C lies on path P, whereas the block B does not lie on path P.

The paths along which an instruction is speculative can be encoded in a path vector, which may be designated a "speculation path Vector (SPV)". In such a path vector, a bit would be set if the instruction is speculatively executed on the path to which the bit corresponds. Otherwise the bit would be clear. An SPV is computed according to equation (6):

$$SPV(B,C) = BPV(C) - BPV(B) \qquad (6)$$

In the control flow graph of FIG. 9, for example, if an instruction is moved from block 78 to block 72, the result of equation (6) indicates that the instruction is speculative along paths $P_0$, $P_2$, and $P_3$, but not along path $P_1$. From equation (6), we have:

---
SPV(block 78, block 72)    = BPV(block 72)-BPV(block 78)
    = (1111)-(0010)
    = (1101)
---

Further, if an instruction is moved from block 78 to block 74, it can be seen that the instruction is speculative along path P0 only:

---
SPV(block 78, block 74)    = BPV(block 74)-BPV(block 78)
    = (0011)-(0010)
    = (0001)
---

In contrast, if an instruction is moved from block 80 to block 74, the code motion is not speculative, since the resulting SPV is 0:

| | |
|---|---|
| SPV(block 78, block 74) | = BPV(block 74)-BPV(block 80) |
| | = (0011)-(0011) |
| | = (0000) |

Associated with each control flow path is a probability that the particular path will be taken during execution of the program. It is useful to know how speculative (wasteful) a code motion is (i.e., likelihood of the instruction being executed unnecessarily). This speculativeness is simply the sum of the probabilities of the paths which have their corresponding bits set in the speculation path vector. Using this measure during instruction scheduling, less speculative code motions can be given preference over more speculative code motions.

An example of an algorithm to compute the speculativeness of code motion from block B to block C is as follows:

```
Speculativeness(B,C)
b = 0;
speculativeness = 0.0;
while (b<NUMBER_OF_PATHS)
    if (SPV(B,C) [b] == 1) /* bth bit of SPV(B,C) = 1?*/
        speculativeness = speculativeness +
        Probability_of_Path(b)    /* probability of path
                                     corresponding to bth bit */
    endif
    b = b+1
endwhile
return speculativeness
```

Thus, a method of providing a combined representation of both data dependence and control flow between a first instruction and a second instruction in a sequence of computer-executable instructions has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of representing data dependence and control flow between a first instruction and a second instruction in a sequence of software instructions, the first instruction and the second instruction each for reading a variable or for writing the variable, the sequence characterized by a plurality of control flow paths, the method comprising the steps of:

allocating a plurality of units of memory space, each unit corresponding to one of the control flow paths; and assigning a value to each unit to indicate whether a dependency exists between the first instruction and the second instruction with respect to the variable along the control flow path represented by said unit.

2. A method according to claim 1, wherein the plurality of units of memory space comprises a plurality of bits, the plurality of bits representing a path vector.

3. A method according to claim 2, wherein the first instruction is located in a first instruction block and the second instruction is located in a second instruction block, wherein the assigning step comprises the steps of:

determining which of the control flow paths pass through the first instruction block;

generating a first block vector including a second plurality of bits, each bit corresponding to one of the control flow paths, wherein the value of each bit of the first block vector indicates whether the corresponding control flow path passes through the first instruction block;

determining which of the control flow paths pass through the second instruction block;

generating a second block vector including a third plurality of bits, each bit corresponding to one of the control flow paths, wherein the value of each bit of the second block vector indicates whether the corresponding control flow path passes through the second instruction block; and computing the path vector based on the first block vector and the second block vector.

4. A method according to claim 3, wherein the computing step comprises the step of computing a logic AND of the first block vector and the second block vector.

5. A method according to claim 4, further comprising the steps of:

determining whether the sequence of instructions includes a third instruction between the first instruction and the second instruction;

if the sequence of instructions includes a third instruction between the first instruction and the second instruction, determining whether the third instruction is for writing the variable;

if the third instruction is for writing the variable, determining a third block vector representing the control flow paths which pass through the third block;

wherein the step of computing the path vector further comprises the steps of:

computing, based on the third block vector and the second block vector, a second path vector representing data dependency and control flow between the third instruction and the second instruction; and subtracting the second path vector from the logic AND of the first block vector and the second block vector to generate the path vector.

6. A method of representing data dependence and control flow between a first instruction and a second instruction in a sequence of computer-executable instructions, the sequence of instructions characterized by a plurality of control flow paths, the first instruction and the second instruction each for reading a variable or for writing the variable, the first instruction located in a first instruction block and the second instruction located in a second instruction block, the method comprising the steps of:

generating a first block path vector (BPV) representing the control flow paths which pass through the first instruction block;

generating a second BPV representing the control flow paths which pass through the second instruction block; and computing, based on the first BPV and the second BPV, a first dependency path vector (DPV) representing data dependency and control flow between the first instruction and the second instruction with respect to the variable.

7. A method according to claim 6, further comprising the steps of:

determining which of the control flow paths pass through the first instruction block; and determining which of the control flow paths pass through the second instruction block.

8. A method according to claim 7, wherein:

the first BPV comprises a first plurality of bits, each bit corresponding to one of the control flow paths, wherein the value of each bit of the first plurality of bits indicates whether the corresponding control flow path passes through the first instruction block; and the second BPV comprises a second plurality of bits, each bit corresponding to one of the control flow paths, wherein the value of each bit of the second plurality of bits indicates whether the corresponding control flow path passes through the second instruction block.

9. A method according to claim 8, wherein the computing step comprises the step of computing a logic AND of the first BPV and the second BPV.

10. A method according to claim 9, wherein the sequence of instructions comprises a third instruction between the first instruction and the second instruction, the third instruction included within a third instruction block, wherein the method further comprises the steps of:

determining whether the third instruction is for redefining a variable accessed by both the first instruction and the second instruction;

if the third instruction is for redefining the variable accessed by both the first instruction and the second instruction, determining a third BPV representing the control flow paths which pass through the third block;

wherein the step of computing the first DPV further comprises the steps of:

computing, based on the third BPV and the second BPV, a second DPV representing data dependency and control flow between the third instruction and the second instruction; and subtracting the second DPV from the logic AND of the first BPV and the second BPV to generate the first DPV.

11. A method according to claim 6, wherein:

the step of generating the first BPV comprises the step of storing a first plurality of bits in a first location in a memory, each bit corresponding to one of the control flow paths, wherein the value of each bit of the first plurality of bits indicates whether or not the corresponding control flow path passes through the first instruction block;

the step of generating the second BPV comprises the step of storing the second plurality of bits in a second location in the memory, each bit corresponding to one of the control flow paths, wherein the value of each bit of the second plurality of bits indicates whether or not the corresponding control flow path passes through the second instruction block; and the step of computing the first DPV comprises the step of storing a third plurality of bits in a third location in the memory.

12. A computer-implemented method of representing data dependence and control flow information relating to a first instruction and a second instruction in a sequence of computer-executable instructions, the first instruction for writing a variable to a memory and the second instruction for reading the variable from the memory, the first instruction preceding the second instruction in the sequence of instructions, the sequence of instructions characterized by a plurality of control flow paths, the first instruction included in a first instruction block and the second instruction included in a second instruction block, the method comprising the steps of:

determining which of the control flow paths pass through the first instruction block;

generating a first block path vector (BPV) including a first plurality of bits, each bit corresponding to one of the control flow paths, wherein the value of each bit of the first plurality of bits indicates whether a corresponding control flow path passes through the first block;

determining which of the control flow paths pass through the second instruction block;

generating a second BPV including a second plurality of bits, each bit corresponding to one of the control flow paths, wherein the value of each bit of the second plurality of bits indicates whether a corresponding control flow path passes through the second block; and computing a logical AND of the first BPV and the second BPV to generate a first path vector (DPV);

determining whether the sequence of instructions includes a third instruction between the first instruction and the second instruction, wherein the third instruction is included in a third instruction block;

if the sequence of instructions includes a third instruction between the first instruction and the second instruction, determining whether the third instruction is for writing the variable to the memory; and if the third instruction is for writing the variable to the memory:

determining a third BPV including a third plurality of bits, each bit corresponding to one of the control flow paths, wherein the value of each bit of the third plurality of bits indicates whether or not the corresponding control flow path passes through the third instruction block;

computing a logical AND of the third BPV and the second BPV to generate a second DPV; and subtracting the second DPV from the first DPV; wherein the first DPV represents data dependence and control flow between the first instruction and the second instruction.

13. A method according to claim 12, further comprising the steps of:

storing the first BPV in a first memory location;

storing the second BPV in a second memory location; and storing the first DPV in a third memory location.

14. A machine-implemented method of optimizing a sequence of computer-executable instructions, a subset of the instructions for accessing one or more variables, the method comprising the steps of:

generating a plurality of dependency path vectors (DPVs), each of the DPVs representing data dependency and control flow information between a different pair of the instructions with respect to one of the variables, wherein the instructions include a first instruction for accessing a variable, and wherein the DPVs include a set of initial DPVs corresponding to the variable;

relocating the first instruction to a different location within the sequence of instructions as a possible improvement to the sequence of instructions;

generating a set of updated DPVs corresponding to the variable in accordance with the relocating step; and if the updated DPVs corresponding to the variable are different from the initial DPVs corresponding to the variable, determining that said relocating step represents a functional change in the sequence of instructions.

15. A method according to claim 14, wherein the sequence of instructions is characterized by a plurality of control flow paths, and wherein each of the DPVs comprises a plurality of bits, each bit corresponding to one of the control flow paths, and wherein each bit has a value indicating whether a dependency exists between a pair of the instructions with respect to one of the variables along the control flow path represented by said bit.

16. A method according to claim 15, wherein the step of generating a plurality of DPVs comprises the steps of:
- computing a plurality of block path vectors (BPVs), each of the BPVs corresponding to one of a plurality of blocks of the instructions, each of the BPVs including a plurality of bits, each bit corresponding to one of the control paths and indicating whether said one of the control paths passes through a block; and
- computing each of the DPVs based on two or more of the BPVs.

17. A program storage device readable by a machine, the storage device tangibly embodying program code executable by the machine to perform method steps for representing data dependence and control flow between a first instruction and a second instruction, the first instruction and the second instruction included in a sequence of software instructions, the first instruction and the second instruction each for reading a variable or for writing the variable, the sequence of instructions characterized by a plurality of control flow paths, the method steps comprising the steps of:
- allocating a plurality of bits of memory space as a path vector, each bit corresponding to one of the control flow paths; and
- assigning a value to each bit to indicate whether a dependency exists between the first instruction and the second instruction with respect to the variable along the control flow path represented by said bit, such that the path vector represents data dependency and control flow between the first instruction and the second instruction.

18. A program storage device according to claim 17, wherein the first instruction is located in a first instruction block and the second instruction is located in a second instruction block, and wherein the assigning step comprises the steps of:
- determining which of the control flow paths pass through the first instruction block;
- generating a first block vector including a second plurality of bits, each bit corresponding to one of the control flow paths, wherein the value of each bit of the first block vector indicates whether the corresponding control flow path passes through the first instruction block;
- determining which of the control flow paths pass through the second instruction block;
- generating a second block vector including a third plurality of bits, each bit corresponding to one of the control flow paths, wherein the value of each bit of the second block vector indicates whether the corresponding control flow path passes through the second instruction block; and
- computing the path vector based on the first block vector and the second block vector.

19. A program storage device according to claim 18, wherein the computing step comprises the step of computing a logic AND of the first block vector and the second block vector.

20. A program storage device according to claim 19, wherein the sequence of instructions comprises a third instruction between the first instruction and the second instruction, the third instruction included within a third instruction block, wherein the method steps further comprise the steps of:
- determining whether the third instruction is for writing the variable;
- if the third instruction is for writing the variable, determining a third block vector representing the control flow paths which pass through the third block;

wherein the step of computing the path vector further comprises the steps of:
- computing, based on the third block vector and the second block vector, a second path vector representing data dependency and control flow between the third instruction and the second instruction; and
- subtracting the second path vector from the logic AND of the first block vector and the second block vector to generate the path vector.

21. A computer usable medium having computer readable program code means embodied therein for representing data dependence and control flow between a first instruction and a second instruction in a sequence of computer-executable instructions, the sequence of instructions characterized by a plurality of control flow paths, the first instruction and the second instruction each for reading a variable or for writing the variable, the first instruction located in a first instruction block and the second instruction located in a second instruction block, the computer readable program code means comprising:
- computer readable program code means for generating a first block path vector (BPV) representing the control flow paths which pass through the first instruction block;
- computer readable program code means for generating a second BPV representing the control flow paths which pass through the second instruction block; and
- computer readable program code means for computing, based on the first BPV and the second BPV, a first dependency path vector (DPV) representing data dependency and control flow between the first instruction and the second instruction with respect to the variable.

22. A computer usable medium according to claim 21, wherein the computer readable program code means embodied in said medium further comprises:
- computer readable program code means for determining which of the control flow paths pass through the first instruction block; and
- computer readable program code means for determining which of the control flow paths pass through the second instruction block.

23. A computer usable medium according to claim 22, wherein:
- the first BPV comprises a first plurality of bits, each bit corresponding to one of the control flow paths, wherein the value of each bit of the first plurality of bits indicates whether the corresponding control flow path passes through the first instruction block; and
- the second BPV comprises a second plurality of bits, each bit corresponding to one of the control flow paths, wherein the value of each bit of the second plurality of bits indicates whether the corresponding control flow path passes through the second instruction block.

24. A computer usable medium according to claim 23, wherein the computer readable program code means for computing comprises computer readable program code means for computing a logic AND of the first BPV and the second BPV.

25. A computer usable medium according to claim 24, wherein the sequence of instructions comprises a third instruction between the first instruction and the second instruction, the third instruction included within a third instruction block, wherein the computer readable program code means embodied in said medium further comprises:

computer readable program code means for determining whether the third instruction is for redefining a variable accessed by both the first instruction and the second instruction;

computer readable program code means for, if the third instruction is for redefining the variable accessed by both the first instruction and the second instruction, determining a third BPV representing the control flow paths which pass through the third block;

wherein the computer readable program code means for computing the first DPV further comprises:

computer readable program code means for computing, based on the third BPV and the second BPV, a second DPV representing data dependency and control flow between the third instruction and the second instruction; and         computer readable program code means for subtracting the second DPV from the logic AND of the first BPV and the second BPV to generate the first DPV.

26. A computer usable medium according to claim 21, wherein:

the computer readable program code means for generating the first BPV comprises computer readable program code means for storing a first plurality of bits in a first location in a memory, each bit corresponding to one of the control flow paths, wherein the value of each bit of the first plurality of bits indicates whether or not the corresponding control flow path passes through the first instruction block;

the computer readable program code means for generating the second BPV comprises computer readable program code means for storing a second plurality of bits in a second location in the memory, each bit corresponding to one of the control flow paths, wherein the value of each bit of the second plurality of bits indicates whether or not the corresponding control flow path passes through the second instruction block; and     computer readable program code means for computing the first DPV comprises computer readable program code means for storing a third plurality of bits in a third location in the memory.

27. A program storage device readable by a machine, the storage device tangibly embodying program code executable by the machine to perform method steps for optimizing a sequence of computer-executable instructions, a subset of the instructions for accessing one or more variables, the method steps comprising the steps of:

generating a plurality of dependency path vectors (DPVs), each of the DPVs representing data dependency and control flow information between a different pair of the instructions with respect to one of the variables, wherein the instructions include a first instruction for accessing a variable, and wherein the DPVs include a set of initial DPVs corresponding to the variable;

relocating the first instruction to a different location within the sequence of instructions as a possible improvement to the sequence of instructions;

generating a set of updated DPVs corresponding to the variable in accordance with the relocating step; and     if the updated DPVs corresponding to the variable are different from the initial DPVs corresponding to the variable, determining that said relocating step represents a functional change in the sequence of instructions.

28. A program storage device according to claim 27, wherein the sequence of instructions is characterized by a plurality of control flow paths, and wherein each of the DPVs comprises a plurality of bits, each bit corresponding to one of the control flow paths, and wherein each bit has a value indicating whether a dependency exists between a pair of the instructions with respect to one of the variables along the control flow path represented by said bit.

29. A program storage device according to claim 28, wherein the step of generating a plurality of DPVs comprises the steps of:

computing a plurality of block path vectors (BPVs), each of the BPVs corresponding to one of a plurality of blocks of the instructions, each of the BPVs including a plurality of bits, each bit corresponding to one of the control paths and indicating whether said one of the control paths passes through a block; and     computing each of the DPVs based on a plurality of the BPVs.

30. A computer system comprising:

a processor; and a memory coupled to the processor;

wherein the processor is configured to:

allocate a plurality of bits of memory space as a path vector, each bit corresponding to one of a plurality of control flow paths of a sequence of software instructions, the sequence of software instructions including a first instruction and a second instruction each for reading or writing a variable; and     assign a value to each bit of the path vector to indicate whether a dependency exists between the first instruction and the second instruction with respect to the variable along the control flow path represented by said bit, such that the path vector represents data dependency and control flow between the first instruction and the second instruction.

31. A computer system according to claim 30, wherein the first instruction is located in a first instruction block and the second instruction is located in a second instruction block, and wherein the processor is further configured to:

determine which of the control flow paths pass through the first instruction block;

generate a first block vector including a second plurality of bits, each bit corresponding to one of the control flow paths, wherein the value of each bit of the first block vector indicates whether the corresponding control flow path passes through the first instruction block;

determine which of the control flow paths pass through the second instruction block;

generate a second block vector including a third plurality of bits, each bit corresponding to one of the control flow paths, wherein the value of each bit of the second block vector indicates whether the corresponding control flow path passes through the second instruction block; and     compute the path vector based on the first block vector and the second block vector.

32. A computer system according to claim 31, wherein the processor is further configured to compute the path vector as a logic AND of the first block vector and the second block vector.

* * * * *